United States Patent [19]

Maska

[11] Patent Number: 4,873,281
[45] Date of Patent: Oct. 10, 1989

[54] STABLE WATER-SOLUBILIZED POLYESTER/ACRYLIC RESINS MADE UTILIZING HYDROCARBON WAXES AND LOW ACID VALUE POLYESTERS

[75] Inventor: Rudolf Maska, Pittsburgh, Pa.
[73] Assignee: PPG Industries, Inc., Pittsburgh, Pa.
[21] Appl. No.: 102,210
[22] Filed: Sep. 29, 1987
[51] Int. Cl.$^4$ .............................................. C08F 2/16
[52] U.S. Cl. .................. 524/457; 524/487; 524/513; 524/763
[58] Field of Search ............. 524/487, 700, 763, 513, 524/488, 489, 457

[56]  References Cited
U.S. PATENT DOCUMENTS

| | | | |
|---|---|---|---|
| 3,338,985 | 8/1967 | Magut et al. | 260/830 |
| 3,933,939 | 1/1976 | Isozaki et al. | 260/872 |
| 3,989,767 | 11/1976 | Homma et al. | 260/834 |
| 4,033,920 | 7/1977 | Isozaki et al. | 260/29.6 H |
| 4,069,274 | 1/1978 | Shibata et al. | 260/836 |
| 4,089,910 | 5/1978 | Shibata et al. | 260/836 |
| 4,100,127 | 6/1978 | Fukusaki et al. | 260/29.6 |
| 4,113,702 | 9/1978 | Psencik | 528/75 |
| 4,124,551 | 11/1978 | Mathai et al. | 260/23 AR |
| 4,273,888 | 6/1981 | Graetz | 525/31 |
| 4,405,747 | 9/1983 | Ehmann et al. | 524/487 |
| 4,504,609 | 3/1985 | Kuwajima et al. | 524/457 |
| 4,517,322 | 5/1985 | Birkmeyer et al. | 523/501 |
| 4,518,724 | 5/1985 | Kuwajima et al. | 524/457 |
| 4,690,980 | 9/1987 | Singer et al. | 525/286 |

FOREIGN PATENT DOCUMENTS 49-47916  12/1974  Japan .

Primary Examiner—Joseph L. Schofer
Assistant Examiner—T. McDonald
Attorney, Agent, or Firm—Thomas M. Breininger

[57]  ABSTRACT

Disclosed is a water-solubilized resin prepared by combining a solubilizing agent and water with a composition comprising: (I) a saturated polyester polymer having an acid value on solids of from 0 to 30 when the weight average molecular weight of the polyester polymer ranges from 500 to 5,000, and (II) a vinyl polymer derived from a vinyl monomer composition comprising 3 to 50 percent by weight of an ethylenically unsaturated carboxylic acid provided that the vinyl monomer composition has been addition polymerized in the presence of from 1.0 to 50 percent by weight of a hydrocarbon wax based on the total weight of the vinyl monomer composition.

17 Claims, No Drawings

STABLE WATER-SOLUBILIZED POLYESTER/ACRYLIC RESINS MADE UTILIZING HYDROCARBON WAXES AND LOW ACID VALUE POLYESTERS

BACKGROUND OF THE INVENTION

This invention is directed to a stable aqueous composition of a saturated polyester polymer of relatively low acid value and a vinyl polymer prepared using a hydrocarbon wax.

It is desirable for some purposes to be able to take advantage of respective properties of polyester polymers and vinyl polymers such as acrylic polymers in a single aqueous composition, for example, an aqueous coating composition. In such compositions the compatibility of the polyester and vinyl components and the stability of these components in aqueous medium are important. It is known, for example, to incorporate hydrophilic groups such as carboxylic acid groups and/or salts thereof to aid in the solubilization or dispersion of otherwise insoluble polyester and acrylic polymers in water. However, the presence of such groups in the resultant compositions, such as coating compositions, tends to contribute to undersirable water sensitivity and water resistance of films produced from the compositions. The proximity of such hydrophilic groups to ester linkages in polyester polymers possibly may contribute to such water sensitivity. Generally, the higher the molecular weight of, for example, the polyester polymer the more hydrophilic groups per molecule which are needed for water-solubilization.

An object of the present invention is to provide a water-solubilized resin composition of a polyester polymer and vinyl polymer in which the acid value of the polyester polymer for solubilization or dispersion in water is minimized and yet the compatibility of the components with each other is enhanced so as to provide relative stability of the aqueous composition. It is also an object of the present invention to provide an aqueous composition of polyester and acrylic polymers having a low overall acid value. Other objects of the invention will become apparent to the reader infra.

SUMMARY OF THE INVENTION

The present invention is for a water-solubilized resin prepared by combining a solubilizing agent and water with a composition comprising: (I) a saturated polyester polymer having an acid value on solids of from 0 to 30 when the weight average molecular weight of the polyester polymer ranges from 500 to 5,000, and (II) a vinyl polymer derived from a vinyl monomer composition comprising 3 to 50 percent by weight of an ethylenically unsaturated carboxylic acid provided that the vinyl monomer composition has been addition polymerized in the presence of from 1.0 to 50 percent by weight of a hydrocarbon wax based on the total weight of the vinyl monomer composition.

DETAILED DESCRIPTION OF THE INVENTION

A water-solubilized resin of the invention is prepared by combining a solubilizing agent and water with a composition comprising: (I) a saturated polyester polymer having an acid value on solids of from 0 to 30 when the weight average molecular weight of the polyester polymer, as determined by gel permeation chromatography using a polystyrene standard, ranges from 500 to 5,000, preferably from 500 to 2,000, and (II) a vinyl polymer derived from a vinyl monomer composition comprising 3 to 50 percent, typically 3 to 30 percent, by weight of an ethylenically unsaturated carboxylic acid, provided that the vinyl monomer composition has been addition polymerized in the presence of from 1.0 to 50 percent, preferably from 2.0 to 20 percent, by weight of a hydrocarbon wax based on the total weight of the vinyl monomer composition. Suitable hydrocarbon waxes generally have a softening point of from 50 to 200 degrees Celsius (°C.), preferably of from 60° C. to 120° C.

In a preferred embodiment of the invention, the vinyl monomer composition has been addition polymerized in the presence of the saturated polyester polymer of low acid value. Moreover, generally the aforesaid vinyl monomer composition additionally comprises from 97 to 50 percent by weight, preferably from 97 to 70 percent by weight, based on the total weight of said vinyl monomer composition, of one or more other vinyl monomers (i.e., other than the ethylenically unsaturated carboxylic acid) such as an alkylacrylate, an alkylmethacrylate, a hydroxyalkyl acrylate, a hydroxyalkyl methacrylate, an N-alkoxymethyl acrylamide, an N-alkoxymethyl methacrylamide, a vinyl aromatic hydrocarbon, a vinyl aliphatic hydrocarbon or a mixture thereof.

Saturated polyester polymers of low acid value can be prepared by well known techniques by reacting organic polyols, preferably diols, (optionally in combination with monohydric alcohols) with polycarboxylic acids, preferably dicarboxylic acids.

Examples of organic polyols for preparation of the saturated polyester polymer include, but are not limited to, ethylene glycol; propylene glycol; 1,2-butanediol; 1,4-butanediol; 1,3-butanediol; 2,2,4-trimethyl-1,3-pentanediol; 1,5-pentanediol; 2,4-pentanediol; 1,6-hexanediol; 2,5-hexanediol; 2-methyl-1,3-pentanediol; 2-methyl-2,4-pentanediol; 2,4-heptanediol; 2-ethyl-1,3-hexanediol; 2,2-dimethyl-1,3-propanediol; 1,4-cyclohexanediol; 1,4-cyclohexanedimethanol; 1,2-bis(hydroxymethyl)cyclohexane; 1,2-bis(hydroxyethyl)cyclohexane; 2,2-dimethyl-3-hydroxypropyl-2,2-dimethyl-3-hydroxypropionate; diethylene glycol; dipropylene glycol; polycaprolactone diol such as the reaction product of epsilon-caprolactone and ethylene glycol; hydroxyalkylated bisphenols; polyether glycols such as poly(oxytetramethylene)glycol; dimethyl hydantoin diols; isocyanuric acid triols; as well as higher molecular weight polyols such as those produced by oxyalkylating lower molecular weight polyols. Examples of the optional monohydric alcohols include: ethanol, propanol, isopropanol, n-pentanol, neopentyl alcohol, 2-ethoxyethanol, 2-methoxyethanol, 1-hexanol, cyclohexanol, 2-methyl-2-hexanol, 2-ethylhexyl alcohol, 1-octanol, 2-octanol, 1-nonanol, 5-butyl-5-nonanol, isodecyl alcohol, and the like.

Examples of polycarboxylic acids for preparation of the saturated polyester polymer include: phthalic acid; isophthalic acid; terephthalic acid; trimellitic acid; tetrahydrophthalic acid, hexahydrophthalic acid; tetrachlorophthalic acid; decanoic acid; dodecanoic acid; adipic acid, azelaic acid, sebacic acid; succinic acid; malic acid; glutaric acid; malonic acid; pimelic acid; suberic acid; 2,2-dimethylsuccinic acid; 3,3-dimethylglutaric acid; 2,2-dimethylglutaric acid; and the like. Anhydrides of the above acids, where they exist, can also be used and are encompassed by the term "polycarboxylic acid". In addition, certain materials which react in a manner similar to acids to form polyester polymers are also useful. Such materials include lactones such as caprolactone, propylolactone and methyl caprolactone, and hydroxy acids such as hydroxycaproic acid and dimethylolpropionic acid. If a triol or higher hydric alcohol is used, a monocarboxylic acid, such as acetic acid, benzoic acid, stearic acid and hydroxystearic acid often is used in the preparation of the saturated polyester polymer. Also, lower alkyl ester of the acids such as dimethyl glutarate and dimethyl terephthalate can be used. Generally, the saturated polyester polymer has a hydroxyl value of from 10 to 250, preferably of from 100 to 200.

Component (II) for preparing a resin composition of the invention comprises a vinyl polymer derived from a vinyl monomer composition comprising 3 to 50 percent, typically 3 to 30 percent, by weight of an ethylenically unsaturated carboxylic acid, provided that the vinyl monomer composition has been addition polymerized in solution (i.e., solution polymerized in an organic medium) in the presence of an amount as specified above of the hydrocarbon wax. Generally, the vinyl monomer composition additionally comprises from 97 to 50 percent, typically from 97 to 70 percent by weight, based on the total weight of the vinyl monomer composition, of one or more other vinyl monomers such as an alkylacrylate, an alkylmethacrylate, a hydroxyalkyl acrylate, a hydroxyalkyl methacrylate, an N-alkoxymethyl acrylamide, an N-alkoxymethyl methacrylamide, a vinyl aromatic hydrocarbon, a vinyl aliphatic hydrocarbon or a mixture thereof. While acrylic acid and methacrylic acid are preferred for the ethylenically unsaturated carboxylic acid, other suitable ethylenically unsaturated carboxylic acid monomers may be used such as itaconic acid, crotonic acid, maleic acid, and half esters of maleic and fumaric acids, such as butyl hydrogen maleate and ethyl hydrogen fumarate, in which one carboxyl group is esterified with an alcohol. Examples of other ethylenically unsaturated monomers which can be used for making the vinyl polymer include the alkyl acrylates, such as methyl acrylate, ethyl acrylate, butyl acrylate, propyl acrylate, 2-ethylhexyl acrylate and isobornyl acrylate; the alkyl methacrylates, such as methyl methacrylate, butyl methacrylate, 2-ethylhexyl methacrylate, decyl methacrylate, lauryl methacrylate and isobornyl methacrylate; hydroxyalkyl acrylates and methacrylates such as hydroxyethyl acrylate, hydroxypropyl acrylate, hydroxyethyl methacrylate and hydroxypropyl methacrylate; N-alkoxymethyl acrylamides and methacrylamides such as N-butoxymethyl acrylamide, N-butoxymethyl methacrylamide, N-ethoxymethyl acrylamide and N-ethoxymethyl methacrylamide; epoxy functional ethylenically unsaturated monomers such as glycidyl methacrylate and glycidyl acrylate; and unsaturated nitriles, such as acrylonitrile, methacrylonitrile and ethacrylonitrile. Other ethylenically unsaturated monomers (vinyl monomers) which can be used in addition to the acrylic monomers include: vinyl aromatic hydrocarbons (optionally substituted, for example, by halo atoms) such as styrene, alpha-methyl styrene, alpha-chloromethyl styrene and vinyl toluene; and vinyl aliphatic hydrocarbons (optionally substituted, for example, by halo atoms) such as vinyl acetate and vinyl chloride.

The resin, that is components (I) and (II), for the water-solubilized resin composition of the invention typically has an acid value on solids, prior to neutralization with the base, of from 4 to 250 milligrams KOH/gram (mg KOH/g). With respect to the aforesaid acid value in the present context, the term "resin solids" is understood to mean the sum of the solids of components (I) and (II).

Typically the water-solubilized resin is prepared by: (A) addition polymerizing in solution a first portion of the vinyl monomer composition containing at least a portion of the ethylenically unsaturated carboxylic acid in the presence of the saturated polyester polymer and in the presence of the hydrocarbon wax, to form a first product (1), and thereafter (B) addition polymerizing in the first product (1) a second portion of the vinyl monomer composition, to form a second product (2), and thereafter (C) dispersing the product (2) in water utilizing a basic solubilizing agent selected from the group consisting of ammonia, an organic base or a mixture thereof. The neutralizing agent typically comprises an amine, usually an alkanol amine. After the aforesaid product (2) is obtained, at least part of the residual acid functionality of the product resin is neutralized with the base, and the resulting neutralized product is then dissolved or dispersed in water either by adding water to the neutralized product or by adding the neutralized product to water. Typically, water is added to the neturalized product.

Examples of other vinyl monomers which can be used in the first and second monomer compositions include those set forth in the description above with respect to other ethylenically unsaturated monomers which can be used for making the vinyl polymer, methyl methacrylate being a preferred monomer for the first monomer composition.

The vinyl polymerization of the first and second monomer compositions generally can be conducted at from 80° C. to 160° C., and typically are conducted at from 130° C. to 150° C.

A vinyl polymerization initiator is employed in the polymerization of the vinyl monomer composition(s). Examples of initiators include: perbenzoates such as tertiary-butyl perbenzoate; azo compounds such as alpha alpha'-azobis(isobutyronitrile); peroxides such as benzoyl peroxide and cumene hydroperoxide; peracetates such as tertiary butyl peracetate; percarbonates such as isopropyl percarbonate, peroxycarbonates such as butyl isopropyl peroxy carbonate, and similar compounds. The quantity of initiator employed can be varied considerably; however, in most instances, it is desirable to utilize from about 0.1 to about 10 percent by weight based on the weight of ethylenically unsaturated monomers used. Where desired, a chain modifying agent or chain transfer agent can be added to the polymerization mixture for control of the molecular weight of the resulting resin. Examples of such agents include the mercaptans, such as tertiary dodecyl mercaptan, dodecyl mercaptaqn, octyl mercaptan, and hexyl mercaptan, tertiary dodecyl mercaptan being preferred.

The vinyl polymerization reactions for preparing a resin composition of the invention generally are carried out in the presence of of an organic solvent, preferably only a limited amount of organic solvent being used so as to minimize the organic solvent content of the resulting product. In the preferred method of preparing a resin of the invention, the polyester polymer serves as a polymerization medium for preparation of the vinyl polymer thereby significantly reducing the amount of organic solvent needed. Solution polymerization procedures which are known in the vinyl addition polymer art are utilized in the present invention with respect to polymerization of the aforesaid first and second monomer compositions. Organic solvents which may be utilized in the polymerization of the monomers include virtually any of the organic solvents heretofore employed in preparing conventional acrylic or vinyl polymers such as, for example, alcohols, ketones, aromatic hydrocarbons or mixtures thereof. Illustrative of organic solvents of the above type which may be employed are alcohols such as lower alkanols containing 2 to 4 carbon atoms including ethanol, propanol, isopropanol, and butanol, butanol being preferred, and simple glycols such as ethylene glycol and propylene glycol; ether alcohols such as ethylene glycol monoethyl ether, ethylene glycol monobutyl ether, propylene glycol monomethyl ether, and dipropylene glycol monoethyl ether; ketones such as methyl ethyl ketone, methyl n-butyl ketone, and methyl isobutyl ketone; esters such as butyl acetate; and aromatic hydrocarbons such as xylene, toluene, and naphtha.

Water-solubilized resins of the invention provide enhanced stability of the polyester and acrylic polymers therein even when the amount of acrylic polymer solids is equal to or greater than 50 percent by weight based on the sum of the solids of the polyester and acrylic components. As used herein, a stable composition is one which has not separated into layers at the end of two weeks from the time the composition is prepared. Stabilized water-solubilized resins of the invention can be prepared from polyester polymers of low acid value and acrylic polymers of relatively low acid value. Moreover, stabilized water-solubilized resinous compositions of the invention can be prepared having relatively low overall acid value. The water-solubilized resins of the invention can be utilized in a variety of applications where aqueous compositions prepared from the combination of polyester and acrylic polymers is desired, for example, in coatings applications.

The following examples illustrate the invention and should not be construed as a limitation on the scope thereof. Unless specifically indicated otherwise, all percentages and amounts are understood to be by weight. Wherever used herein "pbw" and "PBW" mean parts by weight.

EXAMPLE 1

This example illustrates the preparation of a stabilized, water-borne, polyester/acrylic resin composition of the invention.

A reaction vessel equipped with thermometer, stirrer, dropping funnels, reflux condenser and means for maintaining a blanket of nitrogen is charged at room temperature with a composition consisting of a mixture of 500.7 grams (g) of a saturated polyester[1] having an acid value of 27.5, 150.0 g of ethylene glycol monobutyl ether, 12.8 g of Shellmax[2], 12.8 g of Carnauba wax[3] and 58.0 g of butanol. The composition is heated over a period of about 30 minutes to reflux and allowed to reflux for 5 minutes at the end of which period the simultaneous, gradual addition to the vessel of Charge A and Charge X is begun and continued while maintaining reflux. Charge A consists of a mixture of 345.6 g of methyl methacrylate and 83.2 g of methacrylic acid. Charge X consists of a mixture of 11.5 g of t-butyl perbenzoate and 17.3 g of ethylene glycol monobutyl ether. The addition of Charge A takes 4 hours and 45 minutes while the addition of Charge X takes 5.0 hours to complete. Thus the addition of Charge A is completed 15 minutes before the addition of Charge X. When the addition of charge A is complete, the addition of Charge A', consisting of 23.0 g of styrene and 9.0 g of methacrylic acid, is begun and is completed at the end of 15 minutes. Thus the addition of Charges X and A' are completed at the same time. Next, 1.2 g of t-butyl perbenzoate in 1.2 g of ethylene glycol monobutyl ether and a rinse consisting of 5.0 g of ethylene glycol monobutyl ether is added to the vessel. Thereafter, the composition is refluxed for 1.5 hours at the end of which period 1.2 g of t-butyl perbenzoate in 1.2 g of ethylene glycol monobutyl ether is added to the vessel. Thereafter, the composition is refluxed for 1.5 hours at the end of which period heating is discontinued. A sample of the composition at this point diluted by 1:1 by weight with 2-pyrrolidone is determined to have a total solids content (measured for 2 hours at 150° C.) of 31.0 percent by weight, a Gardner-Holdt bubble-tube viscosity of of E and a residual percent by weight content of methyl methacrylate and styrene, respectively, of 1.2 and 0.05. Next, the composition is cooled to a temperature of 100° C. at which temperature the addition of 113.4 g of dimethyl ethanol amine to the vessel is begun and is completed after about 15 minutes. The composition is held at about 100° C. for 15 minutes at the end of which period the gradual addition of 986.0 g of preheated (about 72° C.) deionized water to the vessel is begun and is completed at the end of 1.5 hours. Thereafter, the composition is maintained at about 72°–74° C. for 2 hours after which heating is discontinued and the composition is allowed to cool to room temperature.

[1] A saturated polyester polymer at 61.3 percent by weight total solids (determined for 1 hour at 100° C.) in ethylene glycol monobutyl ether having a Gardner-Holdt viscosity of Z1+. The polyester polymer is prepared by reacting 1.00 pbw of ethylene glycol, 11.94 pbw of neopentyl glycol, 25.08 pbw of 1.6-hexanediol, 10.00 pbw of dimethylol propionic acid, 25.41 pbw of dimethyl terephthalate and 39.79 pbw of phthalic anhydride to an acid value of 27.5 utilizing conventional condensation polymerization procedures.
[2] Shellmax is a petroleum wax having a softening point of about 60° C. available from Shell Oil Co.
[3] A hydrocarbon wax having a softening point of about 80° C. available from Strahl & Pitsch, Inc.

The resulting product is a stabilized, water-borne, polyester/acrylic resin of the invention. It is determined to have a total solids content (110° C. for 1 hour) of 33.1 percent by weight, a Brookfield viscosity (No. 4 spindle; 20 rpm) of 705 cps, a pH of 8.08, 0.551 milliequivalents of acid, 0.568 milliequivalents of base and a weight average molecular weight of 19,721 determined by gel permeation chromatography using a polystyrene standard and tetrahydrofuran as carrier solvent.

EXAMPLE 2

This example illustrates the preparation of a comparative, water-borne, polyester/acrylic resin composition using the same components as for Example 1 except that no hydrocarbon wax is used and acrylic acid instead of methacrylic acid is used. It is believed that the substitution of acrylic acid for methacrylic acid should contribute to some extent to enhanced stability; nevertheless the resulting product is unstable.

A reaction vessel equipped with thermometer, stirrer, dropping funnels, reflux condenser and means for maintaining a blanket of nitrogen is charged at room temperature with a composition consisting of a mixture of 500.7 grams (g) of a saturated polyester[1] having an acid value of 27.5, 170.0 g of ethylene glycol monobutyl ether, 50.0 g of butanol. The composition is heated over a period of about 30 minutes to reflux and allowed to reflux for 5 minutes at the end of which period the simultaneous, gradual addition to the vessel of Charge A and Charge X is begun and continued while maintaining reflux. Charge A consists of a mixture of 345.6 g of methyl methacrylate and 106.0 g of acrylic acid. Charge X consists of a mixture of 13.8 g of t-butyl perbenzoate and 20.0 g of ethylene glycol monobutyl ether. The addition of Charge A takes 4 hours and 45 minutes while the addition of Charge X takes 5.0 hours to complete. Thus the addition of Charge A is completed 15 minutes before the addition of Charge X. When the addition of charge A is complete, the addition of Charge A', consisting of 23.0 g of styrene and 9.0 g of acrylic acid, is begun and is completed at the end of 15 minutes. Thus the addition of Charges X and A' are completed at the same time. Next, 1.2 g of t-butyl perbenzoate in 1.2 g of ethylene glycol monobutyl ether and a rinse consisting of 5.0 g of ethylene glycol monobutyl ether is added to the vessel. Thereafter, the composition is refluxed for 1.5 hours at the end of which period 1.2 g of t-butyl perbenzoate in 1.2 g of ethylene glycol monobutyl ether is added to the vessel. Thereafter, the composition is refluxed for 1.5 hours at the end of which period heating is discontinued. Next, the composition is cooled to a temperature of 100° C. at which temperature the addition of 160.0 g of dimethyl ethanol amine to the vessel is begun and is completed after about 15 minutes. The composition is held at about 100° C. for 15 minutes at the end of which period the gradual addition of 986.0 g of preheated (about 72° C.) deionized water to the vessel is begun and is completed at the end of 1.5 hours. Thereafter, the composition is maintained at about 72°–74° C. for 2 hours after which heating is discontinued and the composition is allowed to cool to room temperature.

[1] As described in footnote 1 to Example 1 above.

The resulting product is unstable and separates in the vessel.

EXAMPLE 3

This example illustrates the preparation of a stabilized, water-borne, polyester/acrylic resin composition of the invention.

A reaction vessel equipped with thermometer, stirrer, dropping funnels, reflux condenser and means for maintaining a blanket of nitrogen is charged at room temperature with a composition consisting of a mixture of 445.1 grams (g) of a saturated polyester[1] having an acid value of 3.1, 119.0 g of ethylene glycol monobutyl ether, 10.7 g of Shellmax[2], 10.7 g of Carnauba wax[3] and 28.0 g of butanol. The composition is heated over a period of about 17 minutes to reflux and allowed to reflux for 3 minutes at the end of which period the simultaneous, gradual addition to the vessel of Charge A and Charge X is begun and continued while maintaining reflux. Charge A consists of a mixture of 201.0 g of methyl methacrylate and 48.0 g of methacrylic acid. Charge X consists of a mixture of 6.7 g of t-butyl perbenzoate and 12.1 g of ethylene glycol monobutyl ether. The addition of Charge A takes 4 hours and 45 minutes while the addition of Charge X takes 5.0 hours to complete. Thus the addition of Charge A is completed 15 minutes before the addition of Charge X. When the addition of charge A is complete, the addition of Charge A', consisting of 13.4 g of styrene and 5.6 g of methacrylic acid, is begun and is completed at the end of 15 minutes. Thus the addition of Charges X and A' are completed at the same time. Next, 0.9 g of t-butyl perbenzoate in 0.8 g of ethylene glycol monobutyl ether and a rinse consisting of 3.5 g of ethylene glycol monobutyl ether is added to the vessel. Thereafter, the composition is refluxed for 1.5 hours at the end of which period 0.9 g of t-butyl perbenzoate in 0.8 g of ethylene glycol monobutyl ether is added to the vessel. Thereafter, the composition is refluxed for 1.5 hours at the end of which period heating is discontinued. A sample of the composition at this point diluted 1:1 by weight with 2-pyrrolidone is determined to have a total solids content (measured for 2 hours at 150° C. of 31.1 percent by weight, a Gardner-Holdt bubble-tube viscosity of of B and a residual percent by weight content of methyl methacrylate and styrene, respectively, of 1.2 and 0.05. Next, the composition is cooled to a temperature of 100° C. at which temperature the addition of 57.7 g of dimethyl ethanol amine to the vessel is begun and is completed after about 15 minutes. The composition is held at about 100° C. for 15 minutes at the end of which period the gradual addition of 620.2 g of preheated (about 72° C.) deionized water to the vessel is begun and is completed at the end of 1.5 hours. Thereafter, the composition is maintained at about 72°–74° C. for 2 hours after which heating is discontinued and the composition is allowed to cool to room temperature.

[1] A saturated polyester polymer at 60.4 percent by weight total solids (determined for 1 hour at 110° C.) in a mixture of 97 percent by weight of ethylene glycol monobutyl ether and 3 percent by weight of xylene. The polyester polymer is prepared by reacting 1.00 pbw of ethylene glycol, 11.94 pbw of neopentyl glycol, 34.45 pbw of 1,6-hexanediol and 45.43 pbw of isophthalic acid to an acid value of 3.1 utilizing conventional condensation polymerization procedures.
[2] Shellmax is a petroleum wax having a softening point of about 60° C. available from Shell Oil Co.
[3] A hydrocarbon wax having a softening point of about 80° C. available from Strahl & Pitsch, Inc.

The resulting product is a stabilized, water-borne, polyester/acrylic resin of the invention. It is determined to have a total solids content (110° C. for 1 hour) of 35.0 percent by weight, a Brookfield viscosity (No. 4 spindle; 20 rpm) of 2510 cps, a pH of 8.25, 0.398 milliequivalents of acid, 0.396 milliequivalents of base and a weight average molecular weight of 8,374 determined by gel permeation chromatography using a polystyrene standard and tetrahydrofuran as carrier solvent. The product is still stable after 5 days.

EXAMPLE 4

This example illustrates the preparation of a comparative, water-borne, polyester/acrylic resin composition using the same components as for Example 3 except that no hydrocarbon wax is used.

A reaction vessel equipped with thermometer, stirrer, dropping funnels, reflux condenser and means for maintaining a blanket of nitrogen is charged at room temperature with a composition consisting of a mixture of 445.1 grams (g) of a saturated polyester[1] having an acid value of 3.1, 119.0 g of ethylene glycol monobutyl ether and 28.0 g of butanol. The composition is heated over a period of about 17 minutes to reflux and allowed to reflux for 3 minutes at the end of which period the simultaneous, gradual addition to the vessel of Charge A and Charge X is begun and continued while maintaining reflux. Charge A consists of a mixture of 201.0 g of methyl methacrylate and 48.0 g of methacrylic acid. Charge X consists of a mixture of 6.7 g of t-butyl perbenzoate and 12.1 g of ethylene glycol monobutyl ether. The addition of Charge A takes 4 hours and 45 minutes while the addition of Charge X takes 5.0 hours to complete. Thus the addition of Charge A is completed 15 minutes before the addition of Charge X. When the addition of charge A is complete, the addition of Charge A', consisting of 13.4 g of styrene and 5.6 g of methacrylic acid, is begun and is completed at the end of 15 minutes. Thus the addition of Charges X and A' are completed at the same time. Next, 0.9 g of t-butyl perbenzoate in 0.8 g of ethylene glycol monobutyl ether and a rinse consisting of 3.5 g of ethylene glycol monobutyl ether is added to the vessel. Thereafter, the composition is refluxed for 1.5 hours at the end of which period 0.9 g of t-butyl perbenzoate in 0.8 g of ethylene glycol monobutyl ether is added to the vessel. Thereafter, the composition is refluxed for 1.5 hours at the end of which period heating is discontinued. A sample of the composition at this point diluted 1:1 by weight with 2-pyrrolidone is determined to have a total solids content (measured for 2 hours at 150° C. of 30.5 percent by weight, a Gardner-Holdt bubble-tube viscosity of of B and a residual percent by weight content of methyl methacrylate and styrene, respectively, of 1.1 and 0.05. Next, the composition is cooled to a temperature of 100° C. at which temperature the addition of 57.7 g of dimethyl ethanol amine to the vessel is begun and is completed after about 15 minutes. The composition is held at about 100° C. for 15 minutes at the end of which period the gradual addition of 690.2 g of preheated (about 72° C.) deionized water to the vessel is begun and is completed at the end of 1.5 hours. Thereafter, the composition is maintained at about 72°–74° C. for 2 hours after which heating is discontinued and the composition is allowed to cool to room temperature.
[1] As described in footnote 1 to Example 3.

The resulting product is unstable and separates in the vessel in less than 24 hours.

EXAMPLE 5

This example illustrates the preparation of a comparative, water-borne, polyester/acrylic resin composition using a very low acid value polyester, acrylic acid instead of methacrylic acid, and no hydrocarbon wax.

A reaction vessel equipped with thermometer, stirrer, dropping funnels, reflux condenser and means for maintaining a blanket of nitrogen is charged at room temperature with a composition consisting of a mixture of 445.1 grams (g) of a saturated polyester[1] having an acid value of 3.1, 119.0 g of ethylene glycol monobutyl ether and 28.0 g of butanol. The composition is heated over a period of about 30 minutes to reflux and allowed to reflux for 5 minutes at the end of which period the simultaneous, gradual addition to the vessel of Charge A and Charge X is begun and continued while maintaining reflux. Charge A consists of a mixture of 201.0 g of methyl methacrylate and 48.0 g of acrylic acid. Charge X consists of a mixture of 6.7 g of t-butyl perbenzoate and 12.1 g of ethylene glycol monobutyl ether. The addition of Charge A takes 4 hours and 45 minutes while the addition of Charge X takes 5.0 hours to complete. Thus the addition of Charge A is completed 15 minutes before the addition of Charge X. When the addition of charge A is complete, the addition of Charge A', consisting of 13.4 g of styrene and 5.6 g of acrylic acid, is begun and is completed at the end of 15 minutes. Thus the addition of Charges X and A' are completed at the same time. Next, 0.9 g of t-butyl perbenzoate in 0.8 g of ethylene glycol monobutyl ether and a rinse consisting of 3.5 g of ethylene glycol monobutyl ether is added to the vessel. Thereafter, the composition is refluxed for 1.5 hours at the end of which period 0.9 g of t-butyl perbenzoate in 0.8 g of ethylene glycol monobutyl ether is added to the vessel. Thereafter, the composition is refluxed for 1.5 hours at the end of which period heating is discontinued. A sample of the composition at this point diluted 1:1 by weight with 2-pyrrolidone is determined to have a total solids content (measured for 2 hours at 150° C.) of 30.8 percent by weight, a Gardner-Holdt bubble-tube viscosity of of A and a residual percent by weight content of methyl methacrylate and styrene, respectively, of 0.32 and 0.04. Next, the composition is cooled to a temperature of 100° C. at which temperature the addition of 66.3 g of dimethyl ethanol amine to the vessel is begun and is completed after about 15 minutes. The composition is held at about 100° C. for 15 minutes at the end of which period the gradual addition of 690.2 g of preheated (about 72° C.) deionized water to the vessel is begun and is completed at the end of 1.5 hours. Thereafter, the composition is maintained at about 72°–74° C. for 2 hours after which heating is discontinued and the composition is allowed to cool to room temperature.
[1] As described in footnote 1 to Example 3.

The resulting product is unstable, i.e., it begins to separate in the vessel after 3 hours.

What is claimed is:

1. A water-solubilized resin composition prepared by combining a solubilizing agent and water with a composition comprising:
   (I) a saturated polyester polymer having an acid value on solids of from 0 to 30 when the weight average molecular weight of said polyester polymer ranges from 500 to 5,000, and
   (II) a vinyl polymer derived from a vinyl monomer composition comprising 3 to 50 percent by weight of an ethylenically unsaturated carboxylic acid provided that said vinyl monomer composition has been addition polymerized in solution in the presence of from 1.0 to 50 percent by weight of a hydrocarbon wax based on the total weight of said vinyl monomer composition.

2. A resin composition of claim 1 wherein said hydrocarbon wax has a softening point of from 50 to 200 degrees Celsius.

3. The resin composition of claim 1 wherein said vinyl monomer composition has been addition polymerized in the presence of said saturated polyester polymer.

4. The resin composition of claim 1 wherein said vinyl monomer composition has been addition polymerized in the presence of from 2.0 to 20 percent by weight of said hydrocarbon wax.

5. The resin composition of claim 1 wherein said vinyl monomer composition additionally comprises an alkylacrylate, an alkylmethacrylate, a hydroxyalkyl acrylate, a hydroxyalkyl methacrylate, an N-alkoxymethyl acrylamide, an N-alkoxymethyl methacrylamide, a vinyl aromatic hydrocarbon, a vinyl aliphatic hydrocarbon or a mixture thereof.

6. The resin composition of claim 1 wherein said saturated polyester polymer has a hydroxyl value of from 10 to 250.

7. The resin composition of claim 1 wherein said saturated polyester polymer has a weight average molecular weight of from 500 to 2,000.

8. The resin composition of claim 1 wherein said hydrocarbon wax has a softening point of from 50 to 200 degrees Celsius; said vinyl monomer composition has been addition polymerized in the presence of from 2.0 to 20 percent by weight of said hydrocarbon wax; said vinyl monomer composition additionally comprises an alkylacrylate, an alkylmethacrylate, a hydroxyalkyl acrylate, a hydroxyalkyl methacrylate, an N-alkoxymethyl acrylamide, an N-alkoxymethyl methacrylamide, a vinyl aromatic hydrocarbon, a vinyl aliphatic hydrocarbon or a mixture thereof; and said saturated polyester polymer has a hydroxyl value of from 10 to 250 and a weight average molecular weight of from 500 to 2,000.

9. The resin composition of claim 8 wherein said hydrocarbon wax has a softening point of from 60 to 120 degrees Celsius and said saturated polyester polymer has a hydroxyl value of from 100 to 200.

10. The resin composition of claim 1 prepared by:
(A) addition polymerizing in solution a first portion of said vinyl monomer composition containing at least a portion of said ethylenically unsaturated carboxylic acid in the presence of said saturated polyester polymer and in the presence of said hydrocarbon wax, to form a first product (1), and thereafter
(B) addition polymerizing in said first product (1) a second portion of said vinyl monomer composition, to form a second product (2), and thereafter
(C) dispersing said product (2) in water utilizing said solubilizing agent selected from the group consisting of ammonia, an organic base or a mixture thereof.

11. The resin composition of claim 10 wherein the amount of said hydrocarbon wax is from 2.0 to 20 percent by weight based on the total weight of said vinyl monomer composition.

12. The resin composition of claim 10 wherein said first portion of said vinyl monomer composition comprises an alkylacrylate, an alkylmethacrylate, a hydroxyalkyl acrylate, a hydroxyalkyl methacrylate, an N-alkoxymethyl acrylamide, an N-alkoxymethyl methacrylamide, a vinyl aromatic hydrocarbon, a vinyl aliphatic hydrocarbon or a mixture thereof.

13. The resin composition of claim 10 wherein said second portion of said vinyl monomer composition comprises an alkylacrylate, an alkylmethacrylate, a hydroxyalkyl acrylate, a hydroxyalkyl methacrylate, an N-alkoxymethyl acrylamide, an N-alkoxymethyl methacrylamide, a vinyl aromatic hydrocarbon, a vinyl aliphatic hydrocarbon or a mixture thereof.

14. The resin composition of claim 10 wherein said saturated polyester resin has a weight average molecular weight of from 500 to 2,000.

15. The resin composition of claim 10 wherein said saturated polyester resin has a hydroxyl value of from 10 to 250.

16. The resin composition of claim 9 wherein said solubilizing agent comprises an amine.

17. The resin composition of claim 10 wherein the amount of said hydrocarbon wax is from 2.0 to 20 percent by weight based on the total weight of said vinyl monomer composition; said second portion of said vinyl monomer composition comprises an alkylacrylate, an alkylmethacrylate, a hydroxyalkyl acrylate, a hydroxyalkyl methacrylate, an N-alkoxymethyl acrylamide, an N-alkoxymethyl methacrylamide, a vinyl aromatic hydrocarbon, a vinyl aliphatic hydrocarbon or a mixture thereof; said saturated polyester resin has a weight average molecular weight of from 500 to 2,000 and a hydroxyl value of from 100 to 200; and said solubilizing agent comprises an amine.

* * * * *